(12) United States Patent
Hoffman

(10) Patent No.: US 6,222,714 B1
(45) Date of Patent: Apr. 24, 2001

(54) MICROPROCESSOR BASED SETTING GROUP CONTROLLER FOR PROTECTIVE RELAY OPERATIONS

(76) Inventor: Gary R. Hoffman, 32 Phyllis Pl., Randolph, NJ (US) 07869

( * ) Notice: Subject to any disclaimer, the term of this patent is extended or adjusted under 35 U.S.C. 154(b) by 0 days.

(21) Appl. No.: 09/526,218

(22) Filed: Mar. 15, 2000

Related U.S. Application Data (60) Provisional application No. 60/134,562, filed on May 17, 1999.

(51) Int. Cl.[7] .............................. H02H 3/00; H02H 5/04
(52) U.S. Cl. ...................... 361/93.2; 361/62; 361/93.8; 700/292
(58) Field of Search .......................... 361/62–66, 78–79, 361/83, 93.1, 93.2, 93.3, 94, 93.8, 93.9, 103; 700/286, 292, 299; 702/57–58, 60, 64–65; 340/540, 657, 635

(56) References Cited

U.S. PATENT DOCUMENTS

| | | | |
|---|---|---|---|
| 582,265 | * | 5/1897 | Campbell . |
| 4,972,290 | * | 11/1990 | Sun et al. ................................ 361/64 |
| 5,181,026 | * | 1/1993 | Granville ......................... 340/870.28 |
| 5,224,011 | * | 6/1993 | Yalla et al. .............................. 361/93 |
| 5,513,061 | * | 4/1996 | Gelbien et al. .......................... 361/63 |
| 5,644,463 | * | 7/1997 | El-Sharkawi et al. ................. 361/94 |
| 5,822,165 | * | 10/1998 | Moran .................................... 361/78 |
| 6,014,304 | * | 1/2000 | Burnus et al. ........................ 361/103 |

* cited by examiner

*Primary Examiner*—Michael J. Sherry
*Assistant Examiner*—Kim Huynh
(74) *Attorney, Agent, or Firm*—Henry I. Schanzer (57) ABSTRACT

A substation for distributing electric power includes protective relays whose trip points are made to be a function of temperature, the protective relays being used to control the opening and closing of circuit breakers for protecting against fault conditions in at least one of the power input and power output portions of the power distribution system. In one embodiment, a temperature probe which is used to sense the temperature at a selected point of the substation supplies the temperature information to a microcontroller which is programmed to set the trip point of selected protective relays as a function of the sensed temperature.

20 Claims, 5 Drawing Sheets

MICROPROCESSOR BASED SETTING GROUP CONTROLLER FOR PROTECTIVE RELAY OPERATIONS

This application claims the benefit of U.S. Provisional Application No. 60/134,562 filed May 17, 1999.

BACKGROUND OF THE INVENTION

This invention relates to protective relays used in electric power system applications and, in particular, to the automatic and/or semi-automatic control of these protective relays.

Figure 1:
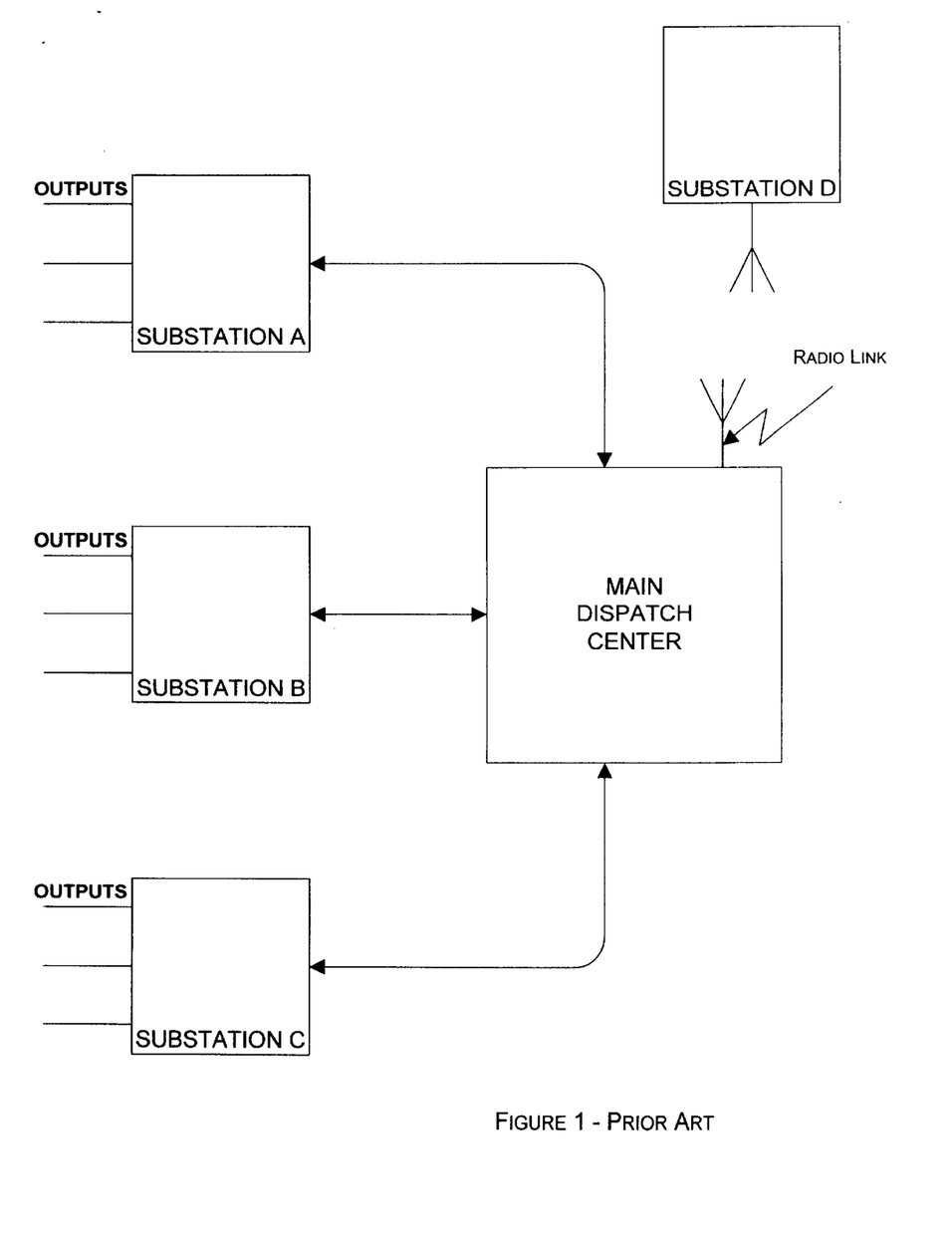
FIG. 1 is a block diagram of a prior art electric power distribution system.

As shown in FIG. 1, in the transmission and distribution of electrical power within an electrical power system operated by an electric utility, there exists multiple substations (A, B, C, D) which control the switching and distribution of electric power from a generating source (main dispatch center) to various distribution points and loads within the power system. These substations normally include a plurality of power transformers whose primary windings are connected to input lines and whose secondary windings are connected to output feeders/distribution lines. The substations also include a plurality of circuit breakers which are coupled to the incoming transmission lines, the power transformers and the outgoing feeders to switch (and hence protect) the respective lines and/or piece of equipment when a fault (e.g., an overload) condition is sensed. The switching (opening and closing) of the circuit breakers within a substation is controlled by protective relays which, by controlling the opening and closure of the circuit breakers, protect the incoming transmission lines, the power transformers, the outgoing feeders and the circuit breakers contained within the substation. The protective relays may be of various configurations, including electromechanical, non-programmable static, and programmable microprocessor based relays. Each protective relay is designed such that when it senses, or responds to, a fault condition, it causes its associated circuit breaker(s) to interrupt the power to, or out of, the device the relay is designed to protect.

In general, the protective relays are designed to sense and/or respond to a fault condition based on a plurality of settings maintained in, or applied to, each relay. Those protective relays which include a microprocessor/controller normally also include memory storage in which these settings are stored. The stored settings may be compared to various signals and preset conditions to enable a relay to sense the presence of faults based on these different signals and preset conditions. Further, these microprocessor based relays have means for selecting one of the stored setting groups when a signal is presented.

Typically, the power ratings of pieces of equipment such as the power transformers, the power distribution lines and the circuit breakers change as a function of temperature. By way of example, a particular power transformer may be rated to safely carry 15,000 amperes at minus (−) 35 degrees centigrade and only 10,000 amperes at plus (+) 85 degrees centigrade. In general, the resistance of the wiring and material used to form the transformers and distribution lines increases with increasing temperature resulting in a decrease in the power rating of these pieces of equipment with increasing temperature. For the example of the particular power transformer, above, a protective relay associated therewith would be, for example, set to "trip" an associated circuit breaker when the current through the transformer would exceed 12-to-13,000 amperes in the winter and 8-to-9,000 amperes in the summer. Therefore, it is a normal operating practice for electric power utilities to change the settings of protective relays at certain times during the course of a year to take into account different seasonal ambient conditions such as temperature. It is also accepted practice in the industry to send a highly skilled technician to each substation to reprogram each protective relay or manually set a new setting group via a rotary switch in the substation. Because of the number of substations, the distance between them, and the time to re-set and test the various protective relays, this is both expensive and impractical.

Also, on a particular day, the ambient temperature in a substation can be substantially higher (or lower) than expected, which either leaves the settings of the various protection relays too sensitive (e.g., too low) or not sensitive enough (e.g., too high). This can lead to mis-operation of these protection devices which results in unwanted blackouts, or to a catastrophic failure of a power transformer or circuit breaker.

Thus, the fixed settings applied to the relays does not solve the problem resulting from the fact that the temperature within the substation can vary over a wide range at any instant of time. This gives rise to a basic problem since the settings of the relays within the substation and their set points is based on preset or preprogrammed information and not on the actual value of the temperature and load conditions. Because of the significant change in the power rating of the transformers and circuit breakers (and other pieces of equipment) as a function of temperature, undervoltage and overvoltage conditions can occur. Also, either there may be a failure to recognize a fault condition or a false error condition may be sensed resulting in unnecessary disruption of power to customers.

SUMMARY OF THE INVENTION

Applicant's invention resides, in part, in the recognition that temperature changes within a substation can occur relatively quickly and unpredictably, whereby even where the relay settings are changed seasonally, they may not be appropriately set at any particular point in time. Therefore, it is highly desirable to continuously sense and monitor ambient conditions, such as temperature, within each substation and to continuously and automatically operate (open and close) the circuit breakers designed to protect the power distribution system. Where protective relays are used to "trip" (open and close) the circuit breakers, a microprocessor (microcontroller) may be used to continuously and automatically signal and control the protective relays for the temperature conditions currently existing within the substation, as well as the load conditions.

A substation containing power transformers and other pieces of equipment for distributing power to outgoing feeders may be subjected to a wide range of ambient and temperature conditions which affect the power transformers and the distribution equipment. Circuit breakers to protect the transformers and the other pieces of equipment are coupled to various points of the transformers and the pieces of equipment. The circuit breakers are operated by means of protective relays which are designed to sense and respond to various fault conditions. In systems embodying the invention, certain of the protective relays and their operation are made responsive to the ambient temperature of the substation.

In a particular embodiment, a temperature probe sensing the temperature of the substation is coupled to the input of a microcontroller whose output controls the settings of protective relays coupled to circuit breakers which, in turn, control the distribution of electric power into and out of the substation.

Protective relays for use in practicing the invention may be controlled by microprocessors and may be used in distribution substations for the purpose of determining when to change a preprogrammed group of settings stored in these protective relays and their associated microprocessors. Typical microprocessor based protective relays include unit and line protection devices with multiple setting groups. This includes, but is not limited to, transformer protection, transmission line protection, and feeder protection relays.

BRIEF DESCRIPTION OF THE DRAWINGS

In the accompanying diagrams like reference characters denote like components.

DETAILED DESCRIPTION OF THE INVENTION

The invention will now be described with reference to FIGS. 2 and 3 which show, respectively, a highly simplified block diagram of a system embodying the invention contained within a substation 10, and a block diagram of a portion of the system shown in FIG. 2. The system embodying the invention includes a microprocessor based setting group microcontroller 12 to which several input signals are applied and which, in response to these input signals, produces a number of control and output signals. Microcontroller 12 may be any one of a number of known microprocessors or microcontrollers.

One of the input signals to the controller 12 is derived from a temperature probe 14 having an output 141 which is coupled via an analog-to-digital (A/D) converter 15 to an input of the microcontroller 12. Only one probe 14 is shown in FIG. 2. However, as shown in FIG. 3, probe 14 may include, for example, a precision thermistor, or any other suitable temperature sensor, 14a, for sensing the ambient temperature in the substation, a temperature sensor 14b for sensing the temperature of the circuit breaker CB1, a temperature sensor 14c for sensing the temperature of the transformer T1, and a temperature sensor 14d for sensing the temperature of the circuit breaker CB2. Thus, it should be understood that a multiplicity of temperature sensors may be placed at different locations within the substation to sense the ambient temperature at the different points. In addition, a multiplicity of temperature sensors may be placed on, within, or in close proximity to, certain critical components, to monitor their temperature. The temperature signals of the various temperature sensors may then be processed individually or they may be averaged or be given different weights to obtain the desired temperature information. The outputs of the various temperature sensors are supplied (via an A/D converter) to microcontroller 12 which is programmed to control the operation of the protective relays as a function of the ambient temperature within the substation and/or as a function of the temperature of certain selected critical components (e.g., the circuit breakers and/or transformers) within the substation and as a function of other inputs such as load current and voltage conditions, as further described below.

Other input signals may be supplied to the controller 12. For example, a remote terminal unit (RTU) 16 which may be used to receive and/or collect a variety of information external or internal to the substation may be used to supply signals via line(s) 161 to controller 12. Other signals from a signal source 171 may be supplied via lines 172,173 to controller 12.

Three phase ($\Phi_A$, $\Phi_B$, $\Phi_C$) power signals are inputted to the substation on lines 17a, 17b, and 17c. The input power lines are respectively coupled via contacts in a circuit breaker CB1 to the primary windings of a three-phase power transformer T1. Transformer T1 produces corresponding three-phase power signals on its secondary bus lines 18a, 18b, and 18c. The three-phase power signals may be distributed within the substation 10 via lines 19a, 19b, and 19c and via contacts in a circuit breaker CB2 to various loads and distribution lines shown as 21a, 21b, 21c. In FIGS. 2 and 3, circuit breaker CB1 is shown to be controlled by line protection relays 51 and by transformer "differential" protection relays 53. Circuit breaker CB2 is shown to be controlled by feeder protection relays 55. The combination of circuit breaker CB1 and protection relays 51 and 53 serves to protect the input power lines and the primary and secondary circuitry of transformer T1. The combination of circuit breaker CB2 and protection relays 55 protects the secondary circuit of transformer T1 against faults along the feeder output lines.

Figure 2:
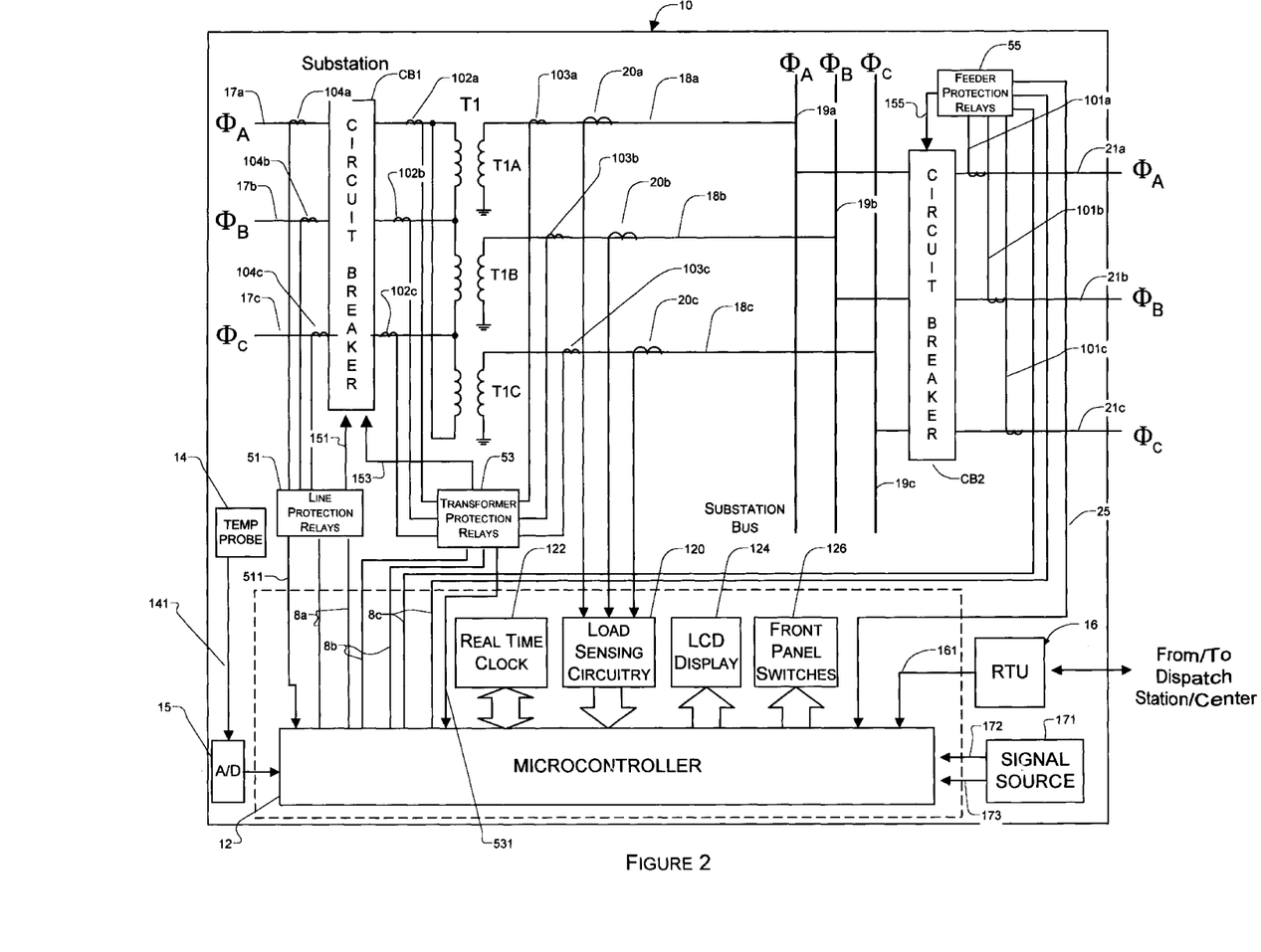
FIG. 2 is a partial block, partial schematic, diagram of a substation containing a system embodying the invention.

In FIG. 2 only one set of output power lines (21a, 21b, 21c) is shown. However, it should be appreciated that more than one circuit breaker, such as CB2, may be used to couple lines 19a, 19b and 19c to other output lines and loads.

The load currents on input power lines 17a, 17b and 17c are sensed by current transformers 104a, 104b, and 104c, respectively. The outputs of current transformers 104a, 104b, and 104c are applied to inputs of line protection relays 51. The line protection relays are shown to be coupled via lines 8a to microcontroller 12. Control lines 8a, 8b, and 8c are outputs from the microcontroller 12. Output lines 8a, 8b and 8c carry electrical output signals from controller 12 to protective relays 51, 53, 55, respectively, with the output signals supplying commands to the respective relays to change setting groups. In FIG. 2, it is shown that line protective relay 51 may supply an input signal via a line 511 to microcontroller 12, transformer protection relays 53 may supply an input signal to microcontroller 12 via a line 531, and the feeder protection relays 55 may supply an input signal via line 25 to controller 12. The information on lines 25, 511 and 531 may be current or voltage information or any other suitable information obtained from their respective relays (or respective current transformers) and which it is desired to supply to the controller 12. This specific electrical signal provides an input to the controller telling it when the load current is above a pre-set threshold. In response to certain predetermined conditions, line protection relays 51 can, and will, "trip" circuit breaker CB1 by providing an electric signal to its trip mechanism via line(s) 151.

The load currents in the primary lines of transformer T1, after passing through the circuit breaker CB1, are sensed by current transformer 102a, 102b and 102c, respectively, and the load currents on secondary lines 18a, 18b and 18c are sensed by current transformers 103a, 103b, and 103c, respectively. The outputs of transformers 102a, 102b, and 102c, and the outputs of transformers 103a, 103b, and 103c are applied to transformer "differential" protection relays 53. In response to certain predetermined conditions, relays 53 can "trip" circuit breaker CB1 via signals on line(s) 153.

The load currents on lines 18a, 18b and 18c may also be sensed by current transformers 20a,20b, and 20c, respectively. The outputs of transformers 20a, 20b, and 20c, are applied to the inputs of a load sensing circuit 120 whose output(s) is supplied as input signals to controller 12.

The load currents in output power (load) lines 21a, 21b and 21c are sensed by current transformers 101a, 101b, and 101c, respectively. The outputs of transformers 101a, 101b, and 101c are applied to inputs of feeder protection relays 55. Controller 12 generates output signals which are coupled to feeder protection relays 55 via lines 8c. In response to certain predetermined conditions, relays 55 can "trip" circuit breaker CB1 via signals on line(s) 155.

A current load signal from feeder protection relays 55 supplied via line 25 to controller 12 may function to provide feedback control. As noted above, microcontroller 12 supplies control signals via lines 8a to input line protection relays 51, via lines 8b to transformer differential protection relays 53, and via lines 8c to output feeder protection relays 55.

In the discussion above and that to follow, the invention is illustrated using current sensing; however it should be appreciated that voltage sensing can also be effectuated to provide power sensing.

TEMPERATURE SENSING

The temperature probe 14 (which may include several different temperature sensors located at different points within the substation or on, within, or adjacent to certain critical pieces of equipment) enables the sensing of the ambient temperature anywhere in the substation 10 and/or the temperature of selected critical components. The temperature probe generates an analog signal which is supplied to analog-digital converter circuit 15, which may be located external to, or within, controller 12. The temperature information is converted to a digital format and is then supplied to processing circuitry within controller 12.

In one mode of operation, the temperature is continuously sensed and the corresponding temperature information is continuously supplied to the microcontroller 12. By way of example, the controller 12 includes associated memory circuitry (see 119 in FIG. 3) storing data corresponding to a power rating chart which specifies the maximum load current which the system should pass at any particular temperature, and/or the maximum input current which the system should draw, and/or the maximum differential that should exist between the primary and secondary sections of transformer T1.

For one mode of operation, the signals from the current transformers 20a, 20b, and 20c (sensing the currents in the secondary windings of T1) may be coupled to load sensing circuitry 120 and via circuitry 120 to controller 12 where these signal currents can be compared with the maximum load current which can be carried along lines 18a, 18b and 18c at the temperature then present in the substation 10. Controller 12 then supplies one or more output signals (or causes one or more signals to be supplied) on lines 8a, 8b, and 8c to relays 51, 53 and 55, respectively, to adjust their respective settings, (e.g., their trip points).

Similarly, to the example above, signals from current transformers 101a, 101b, and 101c supplied to feeder relays 55 may be used to generate input signals which are supplied to controller 12 via line 25. The signals on line 25, when indicative of the load current, may be compared with the maximum specified load current which can be carried along lines 21a, 21b and 21c at the temperature then present in the substation 10.

Similarly to the examples above, the signals from current transformers 104a, 104b, and 104c supplied to line protection relays 51 may be used to generate input signals supplied to controller 12 via line 511. The input signals on line 511, when indicative of the load current, may be compared with the maximum allowable input current which can be drawn, at the input, from lines 17a, 17b and 17c at the temperature then present in the substation 10.

Likewise the signals from current transformers 102a, 102b, and 102c and 103a, 103b, and 103c supplied to transformer protection relays 53 may be used to generate input signals supplied to controller 12 via line 531. The input signals on line 531 may be compared with the maximum condition which can exist across the transformer T1 at the temperature then present in the substation 10. In one embodiment, the transformer protection relays 53 sense the various load conditions and provides one or more logic signals to the controller 12 to indicate whether a predetermined threshold has been attained. These signals are used by the microcontroller in conjunction with temperature data to command the protection relays (51, 53, 55) in the substation to change setting groups. In practice, the signals produced by the protection relays and supplied to controller 12 may be of an analog, or digital, nature proportional to the load current.

Thus, in accordance with the one mode of operation, the settings of the protective relays 51, 53, 55 may be a continuously varying function of the temperature and vary to provide continuous and appropriate protection of the transformer and associated circuitry in accordance with preprogrammed data.

Figures 3, 3A:
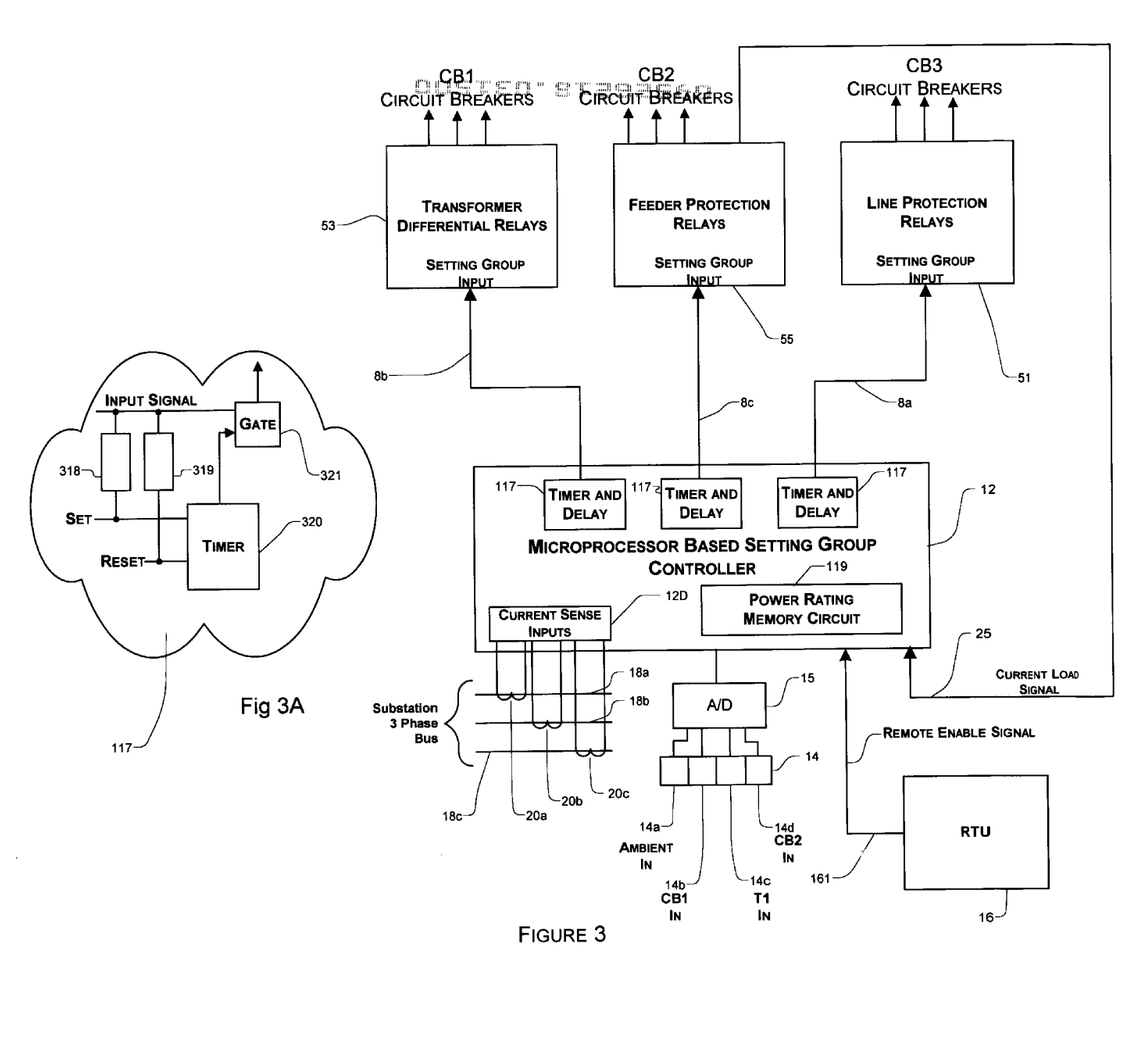
FIG. 3 is a block diagram of a portion of the control system in accordance with the invention.
FIG. 3A is a block diagram of timer and delay circuitry suitable for use in the microprocessor circuit of FIG. 3.

In accordance with another mode of operation, the system shown in FIGS. 2 and 3 may be operated such that a user may enter into the controller 12 a starting temperature set point and an exit temperature set point. The controller 12 may use these two parameters to define an adjustable range of temperatures in which the microprocessor hardware and software generate signals to be processed by the processing circuitry of the controller 12 to provide signals to the setting group inputs of the various group inputs of the various protective relays (e.g., 51, 53, 55) in the substation via control lines 8a, 8b, and 8c. That is, the system may be operated such that the relay settings will be set to have different values for different temperature ranges. For example, between 10 and 20 degree centigrade the relay settings will have one value. Then, between 20 and 30 degrees the relay setting will have a second, different value, so on and so forth.

To prevent large instantaneous changes, the system also contains circuitry for sensing a change in temperature and for sensing that the change of temperature is stable for a preset amount of time before this information is acted upon by the processor 12 and before the information is used to change the relay settings. As further detailed below, the controller may include hardware (see 117 in FIG. 3A) and/or software to control the response of controller 12 so as to include a pre-programmed time delay in response to temperature changes so as to prevent spurious output changes due to rapid fluctuations in temperature.

Load Current Sensing

The system of FIGS. 2 and 3 includes means (e.g., current transformers 20a, 20b, 20c) for sensing the load current. The load current is an analog signal which is converted to a digital format and which is then applied via load sensing circuitry 120 to the controller 12.

Figure 4:
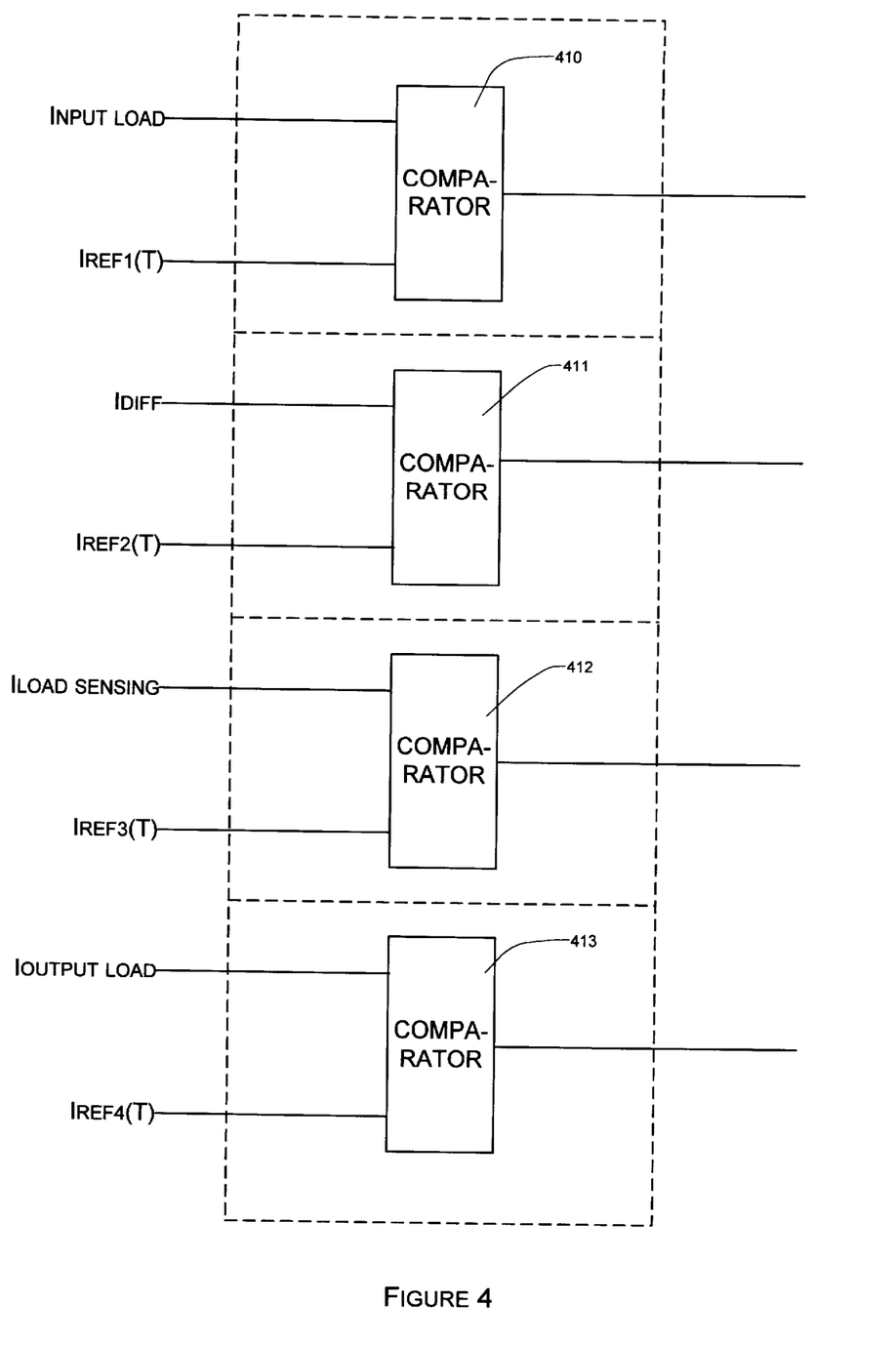
FIG. 4 is a block diagram of circuitry for comparing the actual load currents versus temperature dependent reference currents.

The controller 12 generates certain reference current(s) (Iref) which, as shown in FIG. 4, are compared (e.g., by means of comparators 410, 411, 412, 413) with corresponding selected actual load currents. The actual selected load currents may be, for example: a) Input load derived from lines 17a, 17b, 17c or from relay 51 via line 511; b) $I_{DIF}$ derived from relay 53 via line 531 or any inputs to relay 53; c) $I_{LOAD}$ sensing derived from load sensing circuit 120; and d) $I_{OUTPUTLOAD}$ derived from relay 55 via line 25 or any input to relay 55. In systems embodying the invention, the reference currents (e.g., $I_{REF1}$, $I_{REF2}$, $I_{REF3}$, $I_{REF4}$) typically change as a function of temperature signals derived from probe 14. Thus, in accordance with the invention, a temperature dependent varying reference current is generated and used by the microcontroller or processor for comparison with the actual, or a portion of the actual, currents being monitored. The temperature dependent reference currents are thus used to control the comparators'(410, 411, 412, 413) switching level and the comparator outputs are then fed via circuitry (not shown) to outputs of the microcontroller to set and/or control the trip points of the protective relays which then control the opening and closing of their corresponding circuit breakers.

Digital Input Sensing

Digital input signals (such as signals from source 171, or from a set of front panel switches 126 or from the RTU 16) may be applied to the controller 12. These signals include, but are not limited to, digital or relay contact outputs from a supervisory control and data acquisition (SCADA) remote terminal unit (RTU) for the purpose of enabling or disabling a specific programmable output controlled by the programmable controller 12. Signals can also come from protective relays sensing load current, so as to provide digital signals to controller 12 when the protective relay has been programmed for this purpose. The digital signals can be used independently or in combination with the system's current sensing circuitry. As discussed above, the apparatus also contains circuitry to enable the system to verify that the input is stable for a programmable period of time (e.g., a given delay) before passing the signal to the processor 12.

The method for responding to temperature change includes circuitry and software programmed in the microcontroller. The system monitors (senses) numerous input signal conditions (e.g., temperature, various current levels, various voltage levels, setting of certain switches, etc.) within the substation. When an input signal condition reaches or exceeds a predetermined level a signal is supplied via a first signal level (or transient) detector 318 to the set input of a timer 320, formed within a circuit 117 and located in controller 12, which is programmed (set) to count for a predetermined delay. If the input signal condition persists for a period equal to, or longer than, the predetermined time delay the input signal condition is recognized and appropriate signals are then produced on lines 8a, 8b and 8c to set the trip points of the protective relays. If the input signal condition falls below the predetermined level during the predetermined time delay period, a signal is supplied via a second level (or transition) detector 319 to the reset input of timer 320 which is then reset. The change in the input signal condition, if of insufficient duration, is then not recognized (is filtered out). This prevents spurious changes of any input signal condition from being recognized and causing an unwanted change. The time delay operation is similar to the function performed by coupling debouncing circuitry to a switch to remove the effect of switch bounce on switch closure.

Feedback Responsive Means

As shown in FIG. 2, the system includes circuitry such as the feeder protection relays 55 to which input signals are supplied by controller 12 and which, in turn, has an output which may be fed back via line 25 to an input of controller 12. This feedback signal (and others, not shown) may be used for the purpose of enabling or disabling selected outputs of the relays by means of the controller 12. Each programmable output at 8a, 8b, and 8c may be made to include an adjustable delay provided by timer and delay circuit 117, as shown in FIG. 3.

Time and Date Inputs

As shown in FIGS. 2 and 3, the system includes a real time clock 122 whose output is supplied to the controller 12. The real time clock in combination with the controller 12 can be programmed to provide date and time information. The controller 12 is programmed to enable a user to set a start time (or date) and a stop time (or date) which is used by the controller 12 to enable or disable selected ones of the system's programmable outputs. For example, at certain times of the day (e.g., at night) or on certain days of the week (e.g., Sunday), the maximum allowable load current for a given temperature may be a different value than at other times (e.g., during the day and or during the week). The processor 12 may thus be programmed to allow different load currents for a given temperature depending on other factors such as time of day, day of week, day of month, month of year, etc.

LCD Display

The system includes circuitry for storing selected bits of information and a liquid crystal display (LCD) 124 for displaying selected information. The circuitry may be located within controller 12 or may be located on a separate electronic circuit board. In one embodiment the LCD display included an electronic circuit board including an alphanumeric 16 character ×2 line LCD display and a display controller chip coupled to controller 12.

Communication Circuitry

The system also includes a module such as RTU 16 having an RS-232 interface to allow information generated by the controller 12 and/or the protective relays to communicate with the dispatch center. This information may be sent between the substation and the dispatch center by telephone line or by radio wave.

Front Panel Switches

In FIGS. 2 and 3 there is shown front panel switches 126 for selectively supplying various signals to the controller 12. In one embodiment there are six push button which allow the user to access information stored in the controller or program the controller's set point temperatures, timers and logic. There are also four menu navigation buttons: UP, DOWN, LEFT, and RIGHT. These buttons allow the user to scroll through menus or establish settings. There are two additional buttons: YES, NO which are used in connection with the menu navigation buttons. These allow the user to select a specific programmable parameter to be changed, enter as sub-menu or abort a data entry operation.

Figure 5:
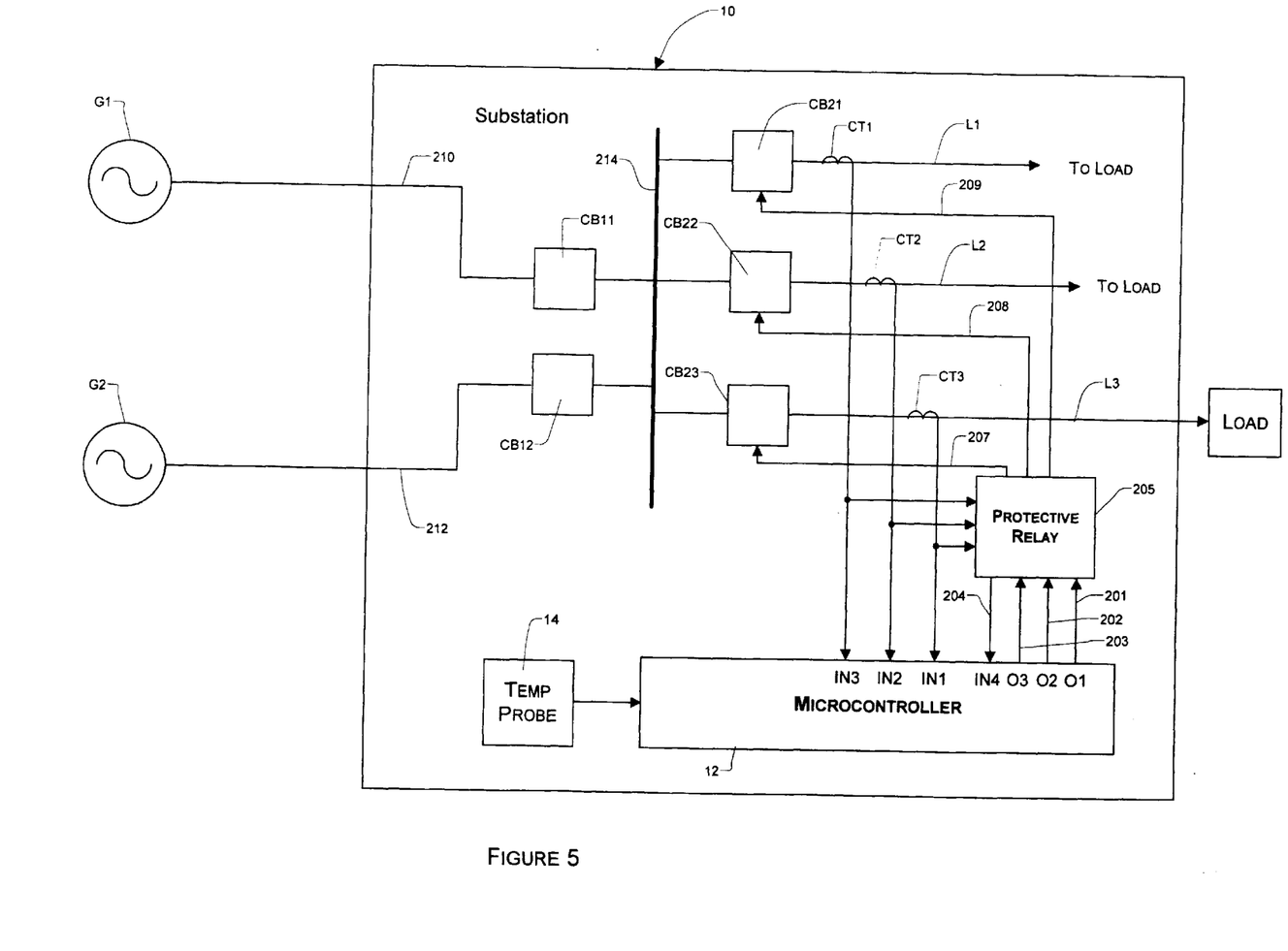
FIG. 5 is a block diagram of a distribution substation containing a system in accordance with the invention.

Referring to FIG. 5, there is shown a distribution substation 10 to which power is supplied via a line 210 from a first power generator G1 and via a line 212 from a second power generator G2. Line 210 is coupled via a circuit breaker CB11 to a main distribution point 214 and line 212 is coupled via a circuit breaker CB12 to distribution point 214. The power at distribution point 214 is distributed via a circuit breaker CB21 to an output power line L1, via a circuit breaker CB22 to an output power line L2, and via a circuit breaker CB23 to an output power line L3. There could be many more input power lines and many more output power lines, but for ease of illustration only two input lines and three output lines are shown. A current transformer (CT1, CT2, CT3) is coupled to each output power line to sense the load current showing in each output power line. Each current transformer (CT1, CT2, CT3) then supplies a signal (IN1, IN2, IN3) to the microcontroller 12 indicative of the amplitude of the current drawn in its corresponding power line. As discussed above, at least one (there could be several) temperature sensor 14, sensing the temperature within the substation 10, provides a signal to microcontroller 12 indicative of the temperature within the substation. The microcontroller 12 processes the temperature and current (power) information and in response to these signals generates one or more output signals at its outputs (O1, O2, O3). The output signals at O1, O2, O3 are fed via lines 201, 202, 203 to protective relays 205 which control the opening and closing of the circuit breakers CB21, CB22, and CB23. In FIG. 5, the protective relays are discrete, individual components. However, the function of these relays may be incorporated into the microcontroller or into the circuit breakers. In which case, the outputs of the microcontroller would be connected directly to the circuit breakers. The outputs of the current transformers may also be applied to the protective relays 205 which may then be designed to supply signals-(via line 204) to IN4 of micontroller 12. As discussed above, the microcontroller includes preprogrammed information stored in various memory location(s) whereby the trip points of the protective relays and/or the point at which the circuit breakers CB21, CB22, and CB23 are opened and closed is a function of both the temperature within the substation and the power being drawn or fed to the various output loads. Note that the loads are normally external to the substation but may include loads located within the substation.

What is claimed is:

1. In a substation for distributing electric power, the combination comprising:

a power transformer having a primary winding and a secondary winding;

a circuit breaker connected in series with one of said primary and secondary windings, said circuit breaker for interrupting the flow of current through the power transformer when the current in at least one of the primary and secondary windings exceeds a permissible threshold level;

a temperature sensor located in said substation for sensing at least one of: (a) the ambient temperature in said substation, (b) the temperature of said power transformer, and (c) the temperature of said circuit breaker, and for producing a signal indicative of the temperature; and means coupling the signal indicative of the temperature to a microcontroller; said microcontroller being programmed to be responsive to said temperature indicative signal from said temperature sensor for generating different values of permissible threshold levels corresponding to different temperature signals, said microcontroller having an output coupled to said circuit breaker for controlling the opening and closing of said circuit breaker as a function of the different values of permissible threshold levels corresponding to the different temperature indicative signals from said temperature sensor.

2. In a substation as claimed in claim 1, wherein said microcontroller is also responsive to a voltage at the secondary winding of said transformer for controlling the opening and closing of said circuit breaker as a function of the combination of said temperature sensor and said voltage.

3. In a substation as claimed in claim 1, wherein said microcontroller is also responsive to the amplitude of the current in the secondary winding of said transformer for controlling the opening and closing of said circuit breaker as a function of the combination of said temperature sensor and said current.

4. In a substation as claimed in claim 1, further including a protective relay and wherein said output of said microcontroller is coupled to said circuit breaker by supplying the output of the microcontroller to said protective relay and said protective relay being coupled to said circuit breaker for controlling its opening and closing.

5. In a substation as claimed in claim 4, wherein the protective relay is responsive to said output from the microcontroller and to at least one of the voltage and current conditions at one of the primary and secondary windings for controlling the opening and closing of the circuit breaker as a function of the temperature in the substation and the at least one of the voltage and current conditions.

6. In a substation as claimed in claim 4, wherein the protective relay has a set point at which it trips the circuit breaker; and wherein the set point of the protective relay is varied by the microcontroller as a function of the temperature in the substation.

7. In a substation as claimed in claim 4, wherein the microcontroller includes comparator means having first and second inputs and an output; wherein a signal indicative of an actual load condition is supplied to said first input, wherein a reference signal generated by the microcontroller is applied to the second input, which reference signal varies as a function of temperature in response to a signal from the temperature sensor; and wherein the output of the comparator is used to set the relay and control the trip point of the circuit breaker.

8. In a substation as claimed in claim 7, wherein the microcontroller is preprogrammed to include information regarding different set points of the protective relay and trip points of the circuit breaker for different temperature conditions.

9. In a substation as claimed in claim 1, wherein said circuit breaker includes a first set of circuit breakers connected to the primary winding of the power transformer and a second set of circuit breakers connected to the secondary winding of the power transformer; and wherein said microcontroller functions to raise the values of the permissible threshold levels when the temperature decreases and to lower the values of the permissible threshold levels when the temperature increases.

10. In a substation as claimed in claim 9, wherein said microcontroller has several outputs; and further including first and second protective relays; said first protective relay being coupled between a first output of the microcontroller and said first set of circuit breakers, and said second protective relay being coupled between a second output of the microcontroller and said second set of circuit breakers for respectively controlling the opening and closing of the first and second circuit breakers.

11. In a substation as claimed in claim 10, wherein said second set of protective relays is responsive to the current flowing in the secondary winding and supplies a signal to the microcontroller indicative of the current level, whereby the microcontroller produces an output signal which is a function of the temperature in the substation and the power drawn in the secondary winding.

12. In a substation as claimed in claim 10, further including a third set of protective relays for sensing a differential between the primary and secondary windings of the transformer and said third set of protective relays being responsive to an output signal from said microcontroller.

13. In a substation as claimed in claim 1 wherein said microcontroller includes time delay means for producing output control signals at its outputs only if an input signal condition persists for longer than a predetermined period.

14. A substation comprising:
   a power transformer having a primary winding and a secondary winding;
   a circuit breaker connected in series with one of said primary and secondary windings; said circuit breaker for interrupting the flow of current through the power transformer when the current in at least one of the primary and secondary windings exceeds a settable threshold level;
   protective relays coupled to said circuit breaker for controlling its opening and closing;
   a temperature sensor located in said substation for sensing at least one of: a) the ambient temperature in said substation, b) the temperature of said power transformer and c) the temperature of the circuit breaker, and for producing a signal indicative of the second temperature;
   means for sensing at least one of the voltage and current present in one of the primary and secondary windings and for producing a first signal indicative of the amplitude of any sensed voltage and current; and
   a microcontroller for setting different threshold levels of the current breaker as a function of temperature, said microcontroller being responsive to said signal indicative of the sensed temperature from said temperature sensor and to said first signal, said microcontroller being programmed to be responsive to said signal indicative of the sensed temperature for calculating different threshold levels corresponding to different temperature signals and for producing an output signal corresponding to said calculations coupled to said protective relays for controlling the opening and closing of said circuit breaker as a function of the temperature sensed by said temperature sensor and the power being delivered by said transformer.

15. In a substation as claimed in claim 14 wherein the temperature sensor senses the temperature of at least two of: (a) said ambient temperature in said substation, (b) the temperature of said power transformer, and (c) the temperature of the circuit breaker.

16. In a substation for transferring electric power from an input power line to an output power line, the combination comprising:
   a circuit breaker connected between said output power line and a load means, said circuit breaker for interrupting the flow of current through the load when the load current exceeds a permissible threshold level, where the load may be located within, or outside, the substation;
   a temperature sensor located in said substation for sensing at least one of: (a) the ambient temperature in said substation and (b) the temperature of the circuit breaker; and a microcontroller having an input and an output; said microcontroller being programmed to determine different permissible threshold levels corresponding to different temperature conditions, the threshol level being generally higher for lower temperatures and lower for higher temperatures;
   means coupling the temperature sensor to said input of said microcontroller for producing a threshold level signal condition at the output of the microcontroller which is a function of the temperature sensed by the temperature sensor; and
   means coupling the output of the microcontroller to said circuit breaker for controlling the amplitude of load current at which said circuit breaker is opened and closed as a function of the threshold conditions resulting from the temperature signals from said temperature sensor.

17. In a substation as claimed in claim 16 wherein said means coupling the output of the microcontroller to said circuit beaker includes a protective relay, said protective relay having a trip point which is controlled by the signals produced at the output of the microcontroller.

18. In a substation as claimed in claim 17, wherein the microcontroller is preprogrammed to produce different output signals for different temperature input signals.

19. In a substation as claimed in claim 17, further including load current sensing means for sensing the load current flowing along said output power line and for producing a corresponding signal applied to an input of the microcontroller, whereby the microcontroller produces a signal applied to the protective relay which is a function of the temperature in the substation and the current level along the output power line.

20. In a substation for transferring electric power from an input power line to an output power line, the combination comprising:
   a microcontroller programmed to establish different threshold values as a function of different temperatures;
   a circuit breaker connected between said output power line and a load means, where the load may be located within, or outside, the substation; said circuit breaker for interrupting the flow of current through the load when the load current exceeds a threshold value established by said microcontroller;
   a protective relay coupled to said circuit breaker for controlling its opening and closing;
   a temperature sensor located in said substation for sensing at least one of the ambient temperature in said substation and the temperature of the circuit breaker and for producing temperature signals indicative of the sensed temperature;
   a load current sensing means for sensing the amplitude of the load current flowing through said output power line; and
   said microcontroller being responsive to signals from said temperature sensor and from said load current sensing means for supplying signals setting the trip point of the protective relay for controlling the opening and closing of said circuit breaker as a function of the amplitude of the load current corresponding to the threshold value established for the corresponding value of temperature.

* * * * *